US011273743B1

(12) United States Patent
Wilkinson et al.

(10) Patent No.: US 11,273,743 B1
(45) Date of Patent: Mar. 15, 2022

(54) MAT MOUNTING STRUCTURE IN SEAT BACK AND VEHICLE SEAT (71) Applicants: Adient Engineering and IP GmbH, Burscheid (DE); Honda Motor Co., Ltd., Minato-ku (JP)

(72) Inventors: Frederick L. Wilkinson, Plymouth, MI (US); Sean M. Osinski, Plymouth, MI (US); Yunxiao Li, Kanagawa (JP); Wenting Zhang, Shanghai (CN); Naoto Komiya, Kanagawa (JP); Laxmikant Indi, Kanagawa (JP); Toshimitsu Mizukoshi, Tokyo (JP); Taiji Misono, Tokyo (JP); Hiroki Ikeda, Tokyo (JP); Hiromitsu Nagatomo, Tokyo (JP); Yuki Fukuda, Tokyo (JP); Souhei Noguchi, Tokyo (JP)

(73) Assignees: Adient Engineering and IP GmbH, Burscheid (DE); Honda Motor Co., Ltd., Toyko (JP)

( * ) Notice: Subject to any disclaimer, the term of this patent is extended or adjusted under 35 U.S.C. 154(b) by 0 days.

(21) Appl. No.: 17/129,989

(22) Filed: Dec. 22, 2020

(51) Int. Cl.
*B60N 2/70* (2006.01)
*B60N 2/68* (2006.01)
*B60N 2/64* (2006.01)
*B60N 2/66* (2006.01)

(52) U.S. Cl.
CPC ............ *B60N 2/7041* (2013.01); *B60N 2/64* (2013.01); *B60N 2/667* (2015.04); *B60N 2/7005* (2013.01); *B60N 2/7029* (2013.01); B60N 2/682 (2013.01); B60N 2002/684 (2013.01)

(58) Field of Classification Search
CPC ............... B60N 2/7005; B60N 2/7029; B60N 2/7041; B60N 2/667
See application file for complete search history.

(56) References Cited

U.S. PATENT DOCUMENTS

| 5,403,069 A * | 4/1995 | Inara | A47C 7/462 297/284.4 |
| 5,762,397 A * | 6/1998 | Venuto | B60N 2/667 297/284.4 |
| 7,044,544 B2 * | 5/2006 | Humer | B60N 2/888 297/216.12 |
| 7,644,987 B2 * | 1/2010 | Humer | B60N 2/888 297/216.12 |

(Continued)

FOREIGN PATENT DOCUMENTS

| EP | 2962895 A1 * | 1/2016 | ............. B60N 2/686 |
| JP | 2019142393 A | 8/2019 | |

*Primary Examiner* — Timothy J Brindley
(74) *Attorney, Agent, or Firm* — Marshall & Melhorn, LLC (57) ABSTRACT

A mat mounting structure for mounting a mat on a seat back frame in a seat back may have a guide wire attachable to the mat configured to receive a force from a back of an occupant on the seat back. The guide wire may have a straight part extending linearly in a longitudinal direction of the seat back frame on a head side or a root side of the seat back frame. A bushing including a penetration hole in which the straight part is insertable in the longitudinal direction may be included in the structure. An attachment hole part in the seat back frame may also be part of the structure. The bushing may be detachably engageable with and attachable to the attachment hole part.

2 Claims, 7 Drawing Sheets

(56) References Cited

U.S. PATENT DOCUMENTS

| | | | | |
|---|---|---|---|---|
| 7,950,737 B2* | 5/2011 | D'Agostini | ............ | B60N 2/888 |
| | | | | 297/216.12 |
| 8,403,272 B2* | 3/2013 | Ohno | ....................... | B60N 2/72 |
| | | | | 248/73 |
| 8,939,504 B2* | 1/2015 | Abe | ......................... | B60N 2/72 |
| | | | | 297/216.13 |
| 9,162,594 B2* | 10/2015 | Adachi | .............. | B60N 2/42745 |
| 10,583,759 B2* | 3/2020 | Yagi | ..................... | B60N 2/7094 |
| 10,889,215 B1* | 1/2021 | Mizukoshi | ............... | B60N 2/68 |
| 2012/0299359 A1* | 11/2012 | Abe | ......................... | B60N 2/70 |
| | | | | 297/452.56 |
| 2015/0091360 A1* | 4/2015 | Arashi | .................. | B60N 2/682 |
| | | | | 297/452.18 |
| 2019/0315255 A1* | 10/2019 | Onuma | .................... | B60N 2/68 |

\* cited by examiner

MAT MOUNTING STRUCTURE IN SEAT BACK AND VEHICLE SEAT

BACKGROUND

1. Technical Field

The present disclosure relates to a mat mounting structure in a seat back and a vehicle seat.

2. Description of the Background

Japanese Unexamined Patent Application Publication No. 2019-142393 discloses a mat mounting structure in a seat back of a vehicle seat in which a mat for supporting the back of an occupant is mounted on a seat back frame to be movable back and forth by inserting a guide wire attached to the mat in a penetration hole formed in the seat back frame.

The above-described mat mounting structure has a protrusion formed by burring or the like at the periphery of the penetration hole of the seat back frame. Thus, the guide wire is smoothly moved up and down in the insertion hole.

The protrusion of the penetration hole in the above-described mat mounting structure is integrally formed by processing the seat back frame. The thickness of the guide wire to be inserted into the penetration hole, the insertion angle, and the stroke of forward and backward movement are specified. It is thus difficult to attach multiple types of mats having different shapes to one seat back, and there is room for improvement from the viewpoint of improving productivity.

SUMMARY

One or more aspects of the present disclosure are directed to provide a mat mounting structure in a seat back and a vehicle seat that improve productivity.

A mat mounting structure for mounting a mat on a seat back frame in a seat back according to an aspect of the present disclosure includes a guide wire attachable to the mat configured to receive a force from a back of an occupant on the seat back, the guide wire including a straight part extending linearly in a longitudinal direction of the seat back frame on a head side or a root side of the seat back frame, a bushing including a penetration hole in which the straight part is insertable in the longitudinal direction, and an attachment hole part in the seat back frame, the bushing being detachably engageable with and attachable to the attachment hole part.

According to the present disclosure, productivity is improved.

DETAILED DESCRIPTION

Embodiments

A vehicle seat according to one or more embodiments will be described with a vehicle seat ST as an example.

Figure 1:
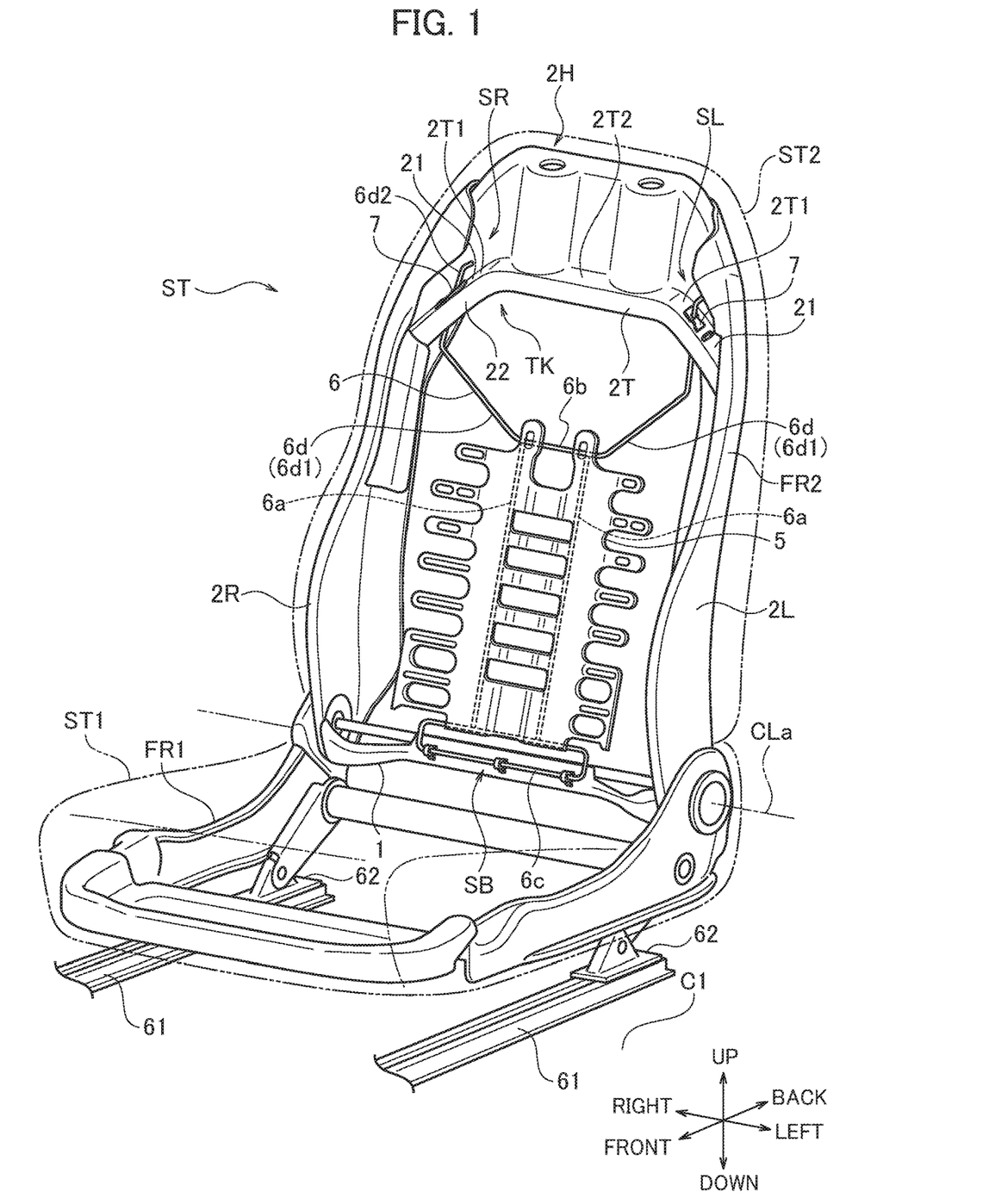
FIG. 1 is a perspective view of a structure of a seat ST as a vehicle seat according to one or more embodiments.

FIG. 1 is a perspective view of the vehicle seat ST (hereinafter also referred to simply as seat ST) for illustrating a frame structure. In the following description, the front, back, left, right, up, and down directions are defined by arrows in FIG. 1. These directions are based on a state of the seat ST mounted on the vehicle. The left and right direction (lateral direction) is the width direction of the seat ST.

In FIG. 1, the seat ST includes a seat cushion ST1 in which a seat cushion frame FR1 is covered with a cushion member, and a seat back ST2 in which a seat back frame FR2 is covered with a cushion member. That is, the seat back frame FR2 is disposed inside the seat back ST2.

A pair of movable rails 62, 62 is mounted to the lower part of the seat cushion frame FR1. The movable rails 62, 62 are supported movably in the longitudinal direction with respect to rails 61, 61 installed on a floor C1 of a vehicle as fixing members. Thus, the seat ST is slidable back and forth with respect to the rails 61, 61.

The seat back frame FR2 is rotatably supported at the rear part of the seat cushion frame FR1 on a rotation axis CLa extending in the lateral direction.

The seat back frame FR2 is a so-called panel frame formed in a frame shape by a panel, and a direction from the root to the head is the longitudinal direction.

The seat back frame FR2 includes a lower panel part 1, a left side panel part 2L and a right side panel part 2R, and an upper panel part 2T.

Specifically, the lower panel part 1 is a part extending in the left and right direction at the lower part of the seat back frame FR2. The left side panel part 2L and the right side panel part 2R are parts respectively rising from the left and right ends of the lower panel part 1 in the longitudinal direction (substantially up and down direction in FIG. 1). The upper panel part 2T is a part connecting the tip parts of the left side panel part 2L and the right side panel part 2R in the left and right direction (width direction).

The upper panel part 2T includes a center wall part 2T2 arranged at the center part in the left and right direction and extending in the left and right direction, and a pair of inclined wall parts 2T1, 2T1 extending obliquely in the left and right lower directions from the center wall part 2T2. The center wall part 2T2 is formed with a headrest support part 2H for supporting a headrest (not shown).

The center wall part 2T2 and the pair of inclined wall parts 2T1, 2T1 on the left and right include an upper wall part 21 having a surface extending substantially in the longitudinal direction, and a front wall part 22 bent downward from the front end of the upper wall part 21 to extend substantially in the up and down direction.

Arranged in the central space surrounded by the frame of the seat back frame FR2 are a guide wire 6 supported by the seat back frame FR2 and a mat 5 in the form of a thin plate attached to the guide wire 6. The mat 5 is a member that receives a force from the back of an occupant leaning against the seat back ST2. Specifically, the mat 5 is arranged elastically movable back and forth and supports the back of the occupant to provide a good feeling.

The guide wire 6 is supported on the seat back frame FR2 at the top and bottom, that is, at support parts SL, SR in the inclined wall parts 2T1, 2T1 and at a support part SB in the lower panel part 1.

The guide wire 6 is formed from a metal wire spring material. The guide wire 6 includes a pair of longitudinal wire parts 6a, 6a that extend longitudinally and are arranged apart on the left and right on the rear surface side of the mat 5, and an upper connection part 6b and a lower connection part 6c that extend left and right and respectively connect the upper parts and lower parts of the longitudinal wire parts 6a, 6a.

The guide wire 6 further includes a pair of arm parts 6d, 6d that respectively extend diagonally up to the left and right from connection parts between the upper connection part 6b and the longitudinal wire parts 6a, 6a.

The mat 5 is mounted on the longitudinal wire parts 6a, 6a and the upper connection part 6b by multiple fasteners (not shown) to be deformed together without being separated by an external force.

The lower connection part 6c is formed in a straight line extending to the left and right and is rotatably attached to the lower panel part 1 around the axis of the lower connection part 6c.

The pair of arm parts 6d, 6d of the guide wire 6 and the support parts SL, SR are symmetrical in shape, and the following describes the arm part 6d and the support part SR on the right.

The arm part 6d includes an inclined extension part 6d1 extending diagonally up from a part where the upper connection part 6b and the longitudinal wire part 6a are connected, and a straight part 6d2 bent from the end of the inclined extension part 6d1 and extending substantially linearly upward. That is, the arm part 6d includes the straight part 6d2 as a part on the distal end.

Next, the support part SR is described in detail with reference to FIGS. 2 to 7.

Figure 2:
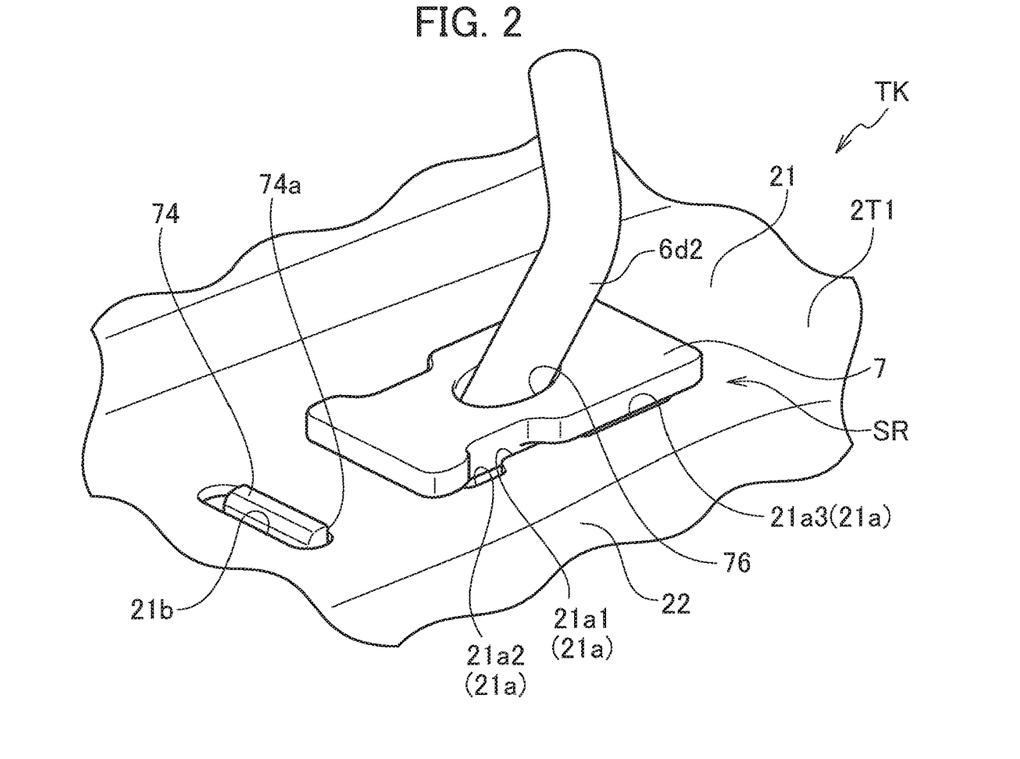
FIG. 2 is a perspective view of a support part SR of a mat mounting structure TK in the seat ST as viewed from the front side (upper side) of an upper wall part 21.
Figure 3:
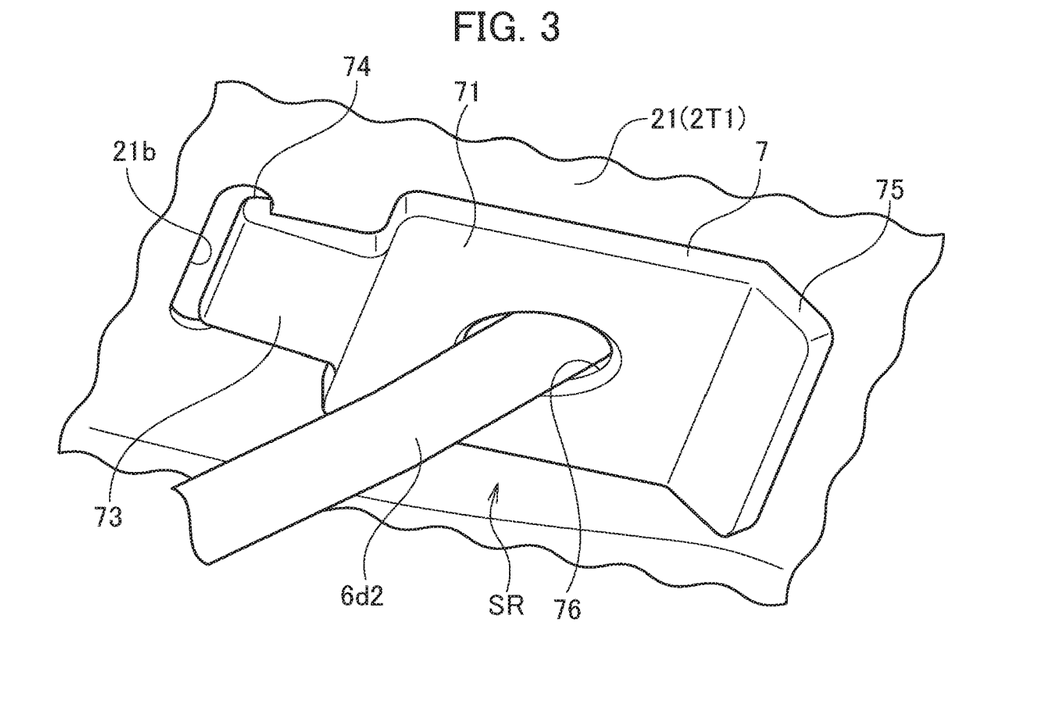
FIG. 3 is a perspective view of the support part SR as viewed from the back side (lower side) of the upper wall part 21.

FIG. 2 is a perspective view of the support part SR in FIG. 1 as viewed from the front side (upper side) of the upper wall part 21. FIG. 3 is a perspective view of the support part SR as viewed from the back side (lower side) of the upper wall part 21.

Figure 4:
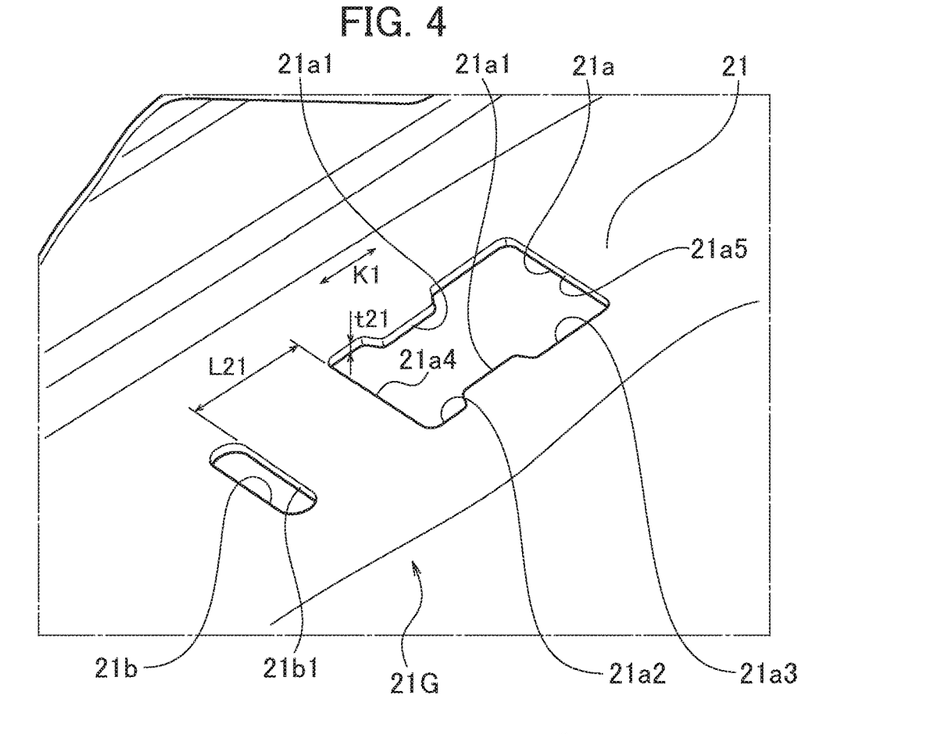
FIG. 4 is a perspective view of a bushing attachment hole part 21G formed in the upper wall part 21 of the support part SR.

FIG. 4 is a perspective view of a bushing attachment hole part 21G formed in the upper wall part 21 of the support part SR.

Figure 5:
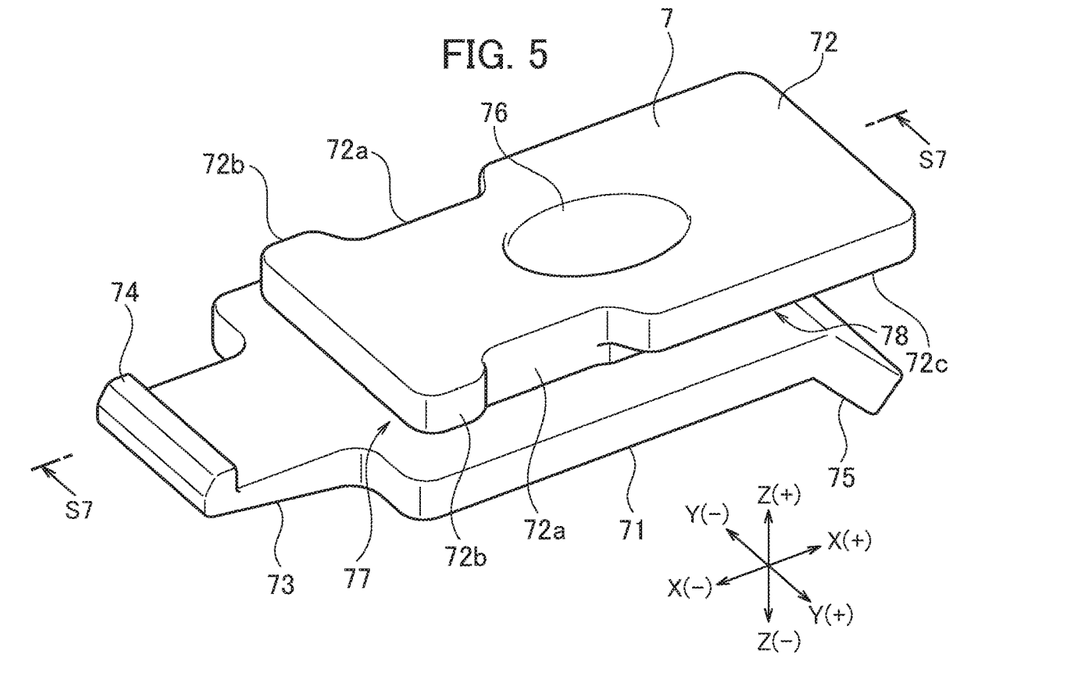
FIG. 5 is a perspective view of a bushing 7.
Figure 6:
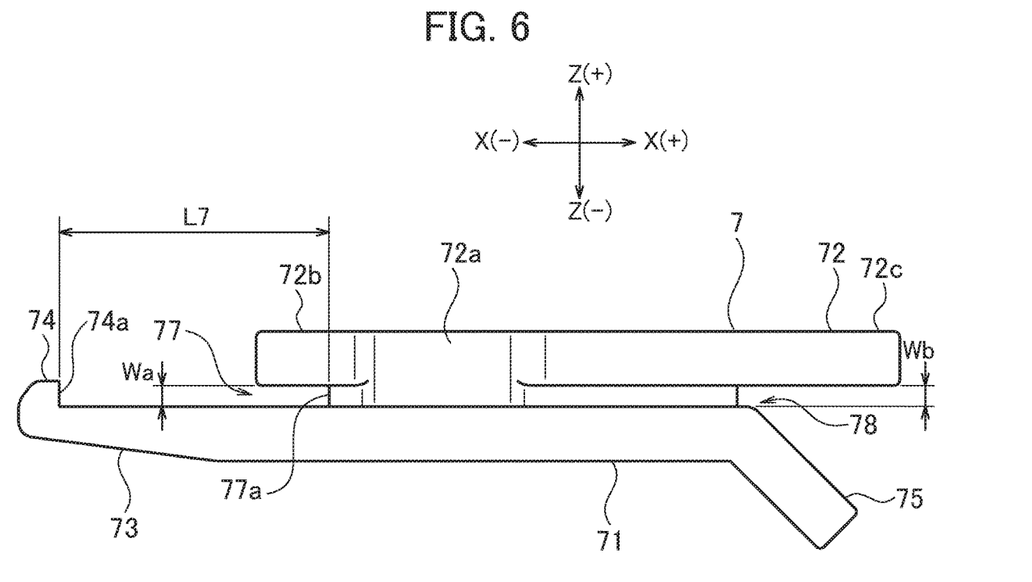
FIG. 6 is a side view of the bushing 7.
Figure 7:
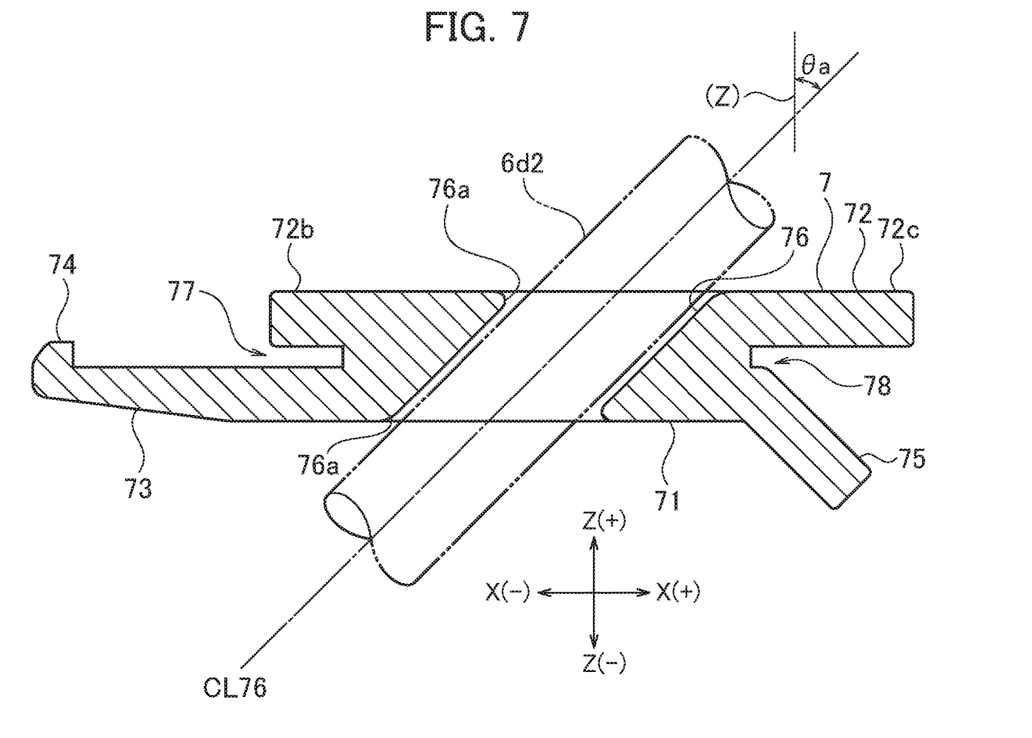
FIG. 7 is a longitudinal sectional view of the bushing 7 taken along the line S7-S7 of FIG. 5.

FIG. 5 is a perspective view of a bushing 7 attached to the bushing attachment hole part 21G. FIG. 6 is a side view of the bushing 7. FIG. 7 is a longitudinal sectional view of the bushing 7 taken along the line S7-S7 of FIG. 5.

In FIGS. 5 to 7, the directions of X, Y, and Z are defined as the directions of arrows in the figures for convenience of explanation. The directions of the respective directions are specified by adding (+) and (−).

The seat back frame FR2 includes a bushing attachment hole part 21G on the upper wall part 21 of the inclined wall part 2T1 of the upper panel part 2T as illustrated in FIG. 4.

The bushing attachment hole part 21G has a base engagement hole 21a as a first hole and a claw engagement hole 21b as a second hole. The claw engagement hole 21b is formed on the lower side (external side) of the base engagement hole 21a in the upper wall part 21.

The base engagement hole 21a is formed in the inclined wall part 2T1 in a substantially rectangular shape whose longitudinal direction is illustrated with arrows K1 in FIG. 4.

The claw engagement hole 21b is formed on one side of the base engagement hole 21a in the longitudinal direction.

The base engagement hole 21a includes a pair of protrusion parts 21a1, 21a1 protruding at a position closer to the claw engagement hole 21b than the center of the length in the longitudinal direction K1 at the edge parts opposing those in the lateral direction to narrow a part of the width by a fixed width.

The base engagement hole 21a includes a part closer to the claw engagement hole 21b with respect to the protrusion parts 21a1, 21a1 as a first opening 21a2, and a part opposite to the claw engagement hole 21b as a second opening 21a3.

The base engagement hole 21a includes an edge part in the longitudinal direction of the first opening 21a2 as an edge 21a4, and an edge part in the longitudinal direction of the second opening 21a3 as an edge 21a5.

The claw engagement hole 21b is formed as an elongated hole extending in the lateral direction of the base engagement hole 21a. A distance between the edge 21a4 of the base engagement hole 21a on the side of the claw engagement hole 21b and an edge part 21b1 of the claw engagement hole 21b on the side of the base engagement hole 21a is defined as a distance L21.

The bushing 7 illustrated in FIGS. 5 to 7 is a resin member to be attached to the bushing attachment hole part 21G.

The bushing 7 is formed by injection molding of resin. An example of resin is POM (polyacetal). The bushing 7 includes a base part 71, a top base 72, an arm part 73, a guide part 75, and a penetration hole 76.

The base part 71 is formed in a substantially rectangular flat plate shape.

The top base 72 is a flat plate-like part formed in connection with the Z (+) side of the base part 71.

The arm part 73 is a strip-like part extending in the X (−) direction from an end part of the base part 71 on the X (−) side, which is a first end part in the longitudinal direction (X direction), with a width narrower than that of the base part 71. Formed at the distal end of the arm part 73 is a claw part 74 that is a second engagement part protruding from the arm part 73 toward the Z (+) side where the top base 72 is formed.

The claw part 74 includes a surface on the X (+) side as an abutting surface 74a in a plane orthogonal to the longitudinal direction.

The guide part 75 is a part extending from an end part of the base part 71 on the X (+) side, which is a second end part in the longitudinal direction, in an inclined manner toward the Z (−) direction in the X (+) direction with the same width as the base part 71. The penetration hole 76 is formed such that an axial line CL76 is inclined by an angle θa in the clockwise direction in FIG. 7 with respect to the Z direction. The penetration hole 76 is a hole in which the straight part 6d2 of the guide wire 6 is insertable in the longitudinal direction of the seat back frame FR2.

In the penetration hole 76, the straight part 6*d*2 of the guide wire 6 is inserted from the Z (−) side to the Z (+) side.

The angle θa is set such that when the bushing 7 is attached to the bushing attachment hole part 21G and the straight part 6 *d*2 of the guide wire 6 is inserted from the Z (−) side in the penetration hole 76, the straight part 6*d*2 extends substantially in the up and down direction.

The penetration hole 76 has an opening edge part that includes chamfered parts 76*a*, 76*a* (see FIG. 7) that are rounded along the entire circumference not to become an edge.

The top base 72 includes concave parts 72*a*, 72*a* at a position closer to the X (−) side than the center in the longitudinal direction that are scooped in the Y direction so that both edge parts in the Y direction as the width direction approach each other.

The top base 72 overhangs at the end of the X (−) side in the X (−) direction and the Y direction as a first overhanging part 72*b* that is a first engagement part. The top base 72 overhangs at the end of the X (+) side in the X (+) direction and the Y direction as a second overhanging part 72*c*.

Thus, as apparent from FIG. 6, a first groove part 77 is formed between the first overhanging part 72*b* and the base part 71, and a second groove part 78 is formed between the second overhanging part 72*c* and the base part 71.

Specifically, the first groove part 77 is formed on the X (−) side and the Y (+) and Y (−) sides. The second groove part 78 is formed on the X (+) side and the Y (+) and Y (−) sides.

A width Wa of the first groove part 77 and a width Wb of the second groove part 78 in the Z direction are equal to each other and slightly larger than a thickness t21 (see FIG. 4) of the upper wall part 21 of the upper panel part 2T.

The bushing 7 has a distance L7 in the X direction between a back wall 77*a* of the first groove part 77 and the abutting surface 74*a* of the claw part 74 illustrated in FIG. 6 equal to or slightly larger than the distance L21 (see FIG. 4) in the bushing attachment hole part 21G.

The bushing 7 described above is set in detail in shape and size to be attached to the bushing attachment hole part 21G in the procedure illustrated in FIGS. 8 to 12. FIGS. 8 to 12 are illustrated as longitudinal sectional views for ease of understanding the structure.

Figure 8:
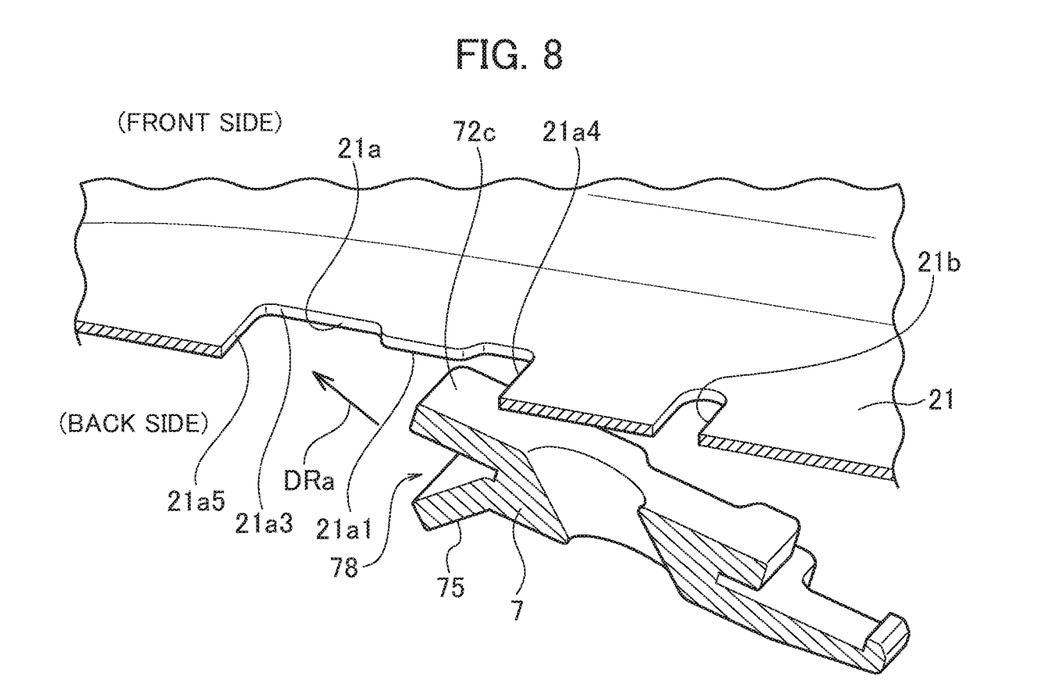
FIG. 8 is a first perspective diagram illustrating a procedure for attaching the bushing 7 to the bushing attachment hole part 21G.

(Step 1) See FIG. 8

The bushing 7 is inserted obliquely to the second opening 21*a*3 of the bushing attachment hole part 21G from the rear side of the upper wall part 21 (arrow DRa) so that the edge 21*a*5 in the longitudinal direction of the second opening 21*a*3 enters between the second overhanging part 72*c* of the top base 72 and the guide part 75.

Figure 9:
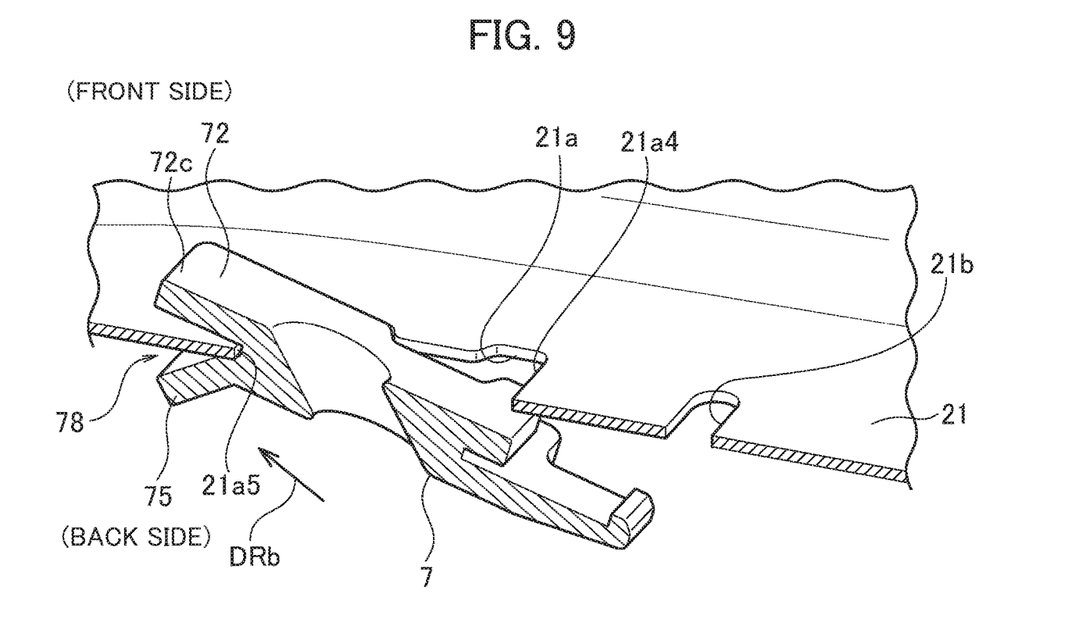
FIG. 9 is a second perspective diagram illustrating the procedure for attaching the bushing 7 to the bushing attachment hole part 21G.

(Step 2) See FIG. 9

The bushing 7 is further inserted (arrow DRb), and while the second overhanging part 72*c* of the bushing 7 is brought to the front side of the upper wall part 21, the edge 21*a*5 of the second opening 21*a*3 is inserted in the second groove part 78.

Figure 10:
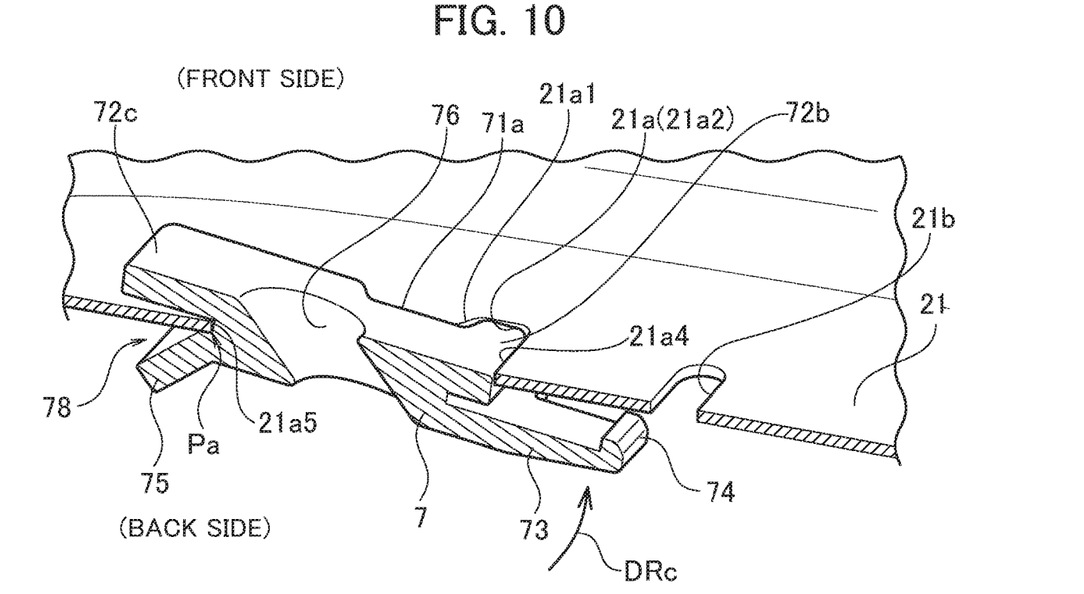
FIG. 10 is a third perspective diagram illustrating the procedure for attaching the bushing 7 to the bushing attachment hole part 21G.

(Step 3) See FIG. 10

With the edge 21*a*5 of the second opening 21*a*3 firmly inserted in the back of the second groove part 78, the bushing 7 is rotated with the innermost position of the second groove part 78 as a rotation center Pa so that the arm part 73 approaches the upper wall part 21 (arrow DRc). At this time, since the protruding parts 21*a*1, 21*a*1 of the base engagement hole 21*a* are located at a position corresponding to the concave parts 72*a*, 72*a* of the bushing 7, they do not interfere with the bushing 7. Thus, the rotation of the bushing 7 is enabled.

Figure 11:
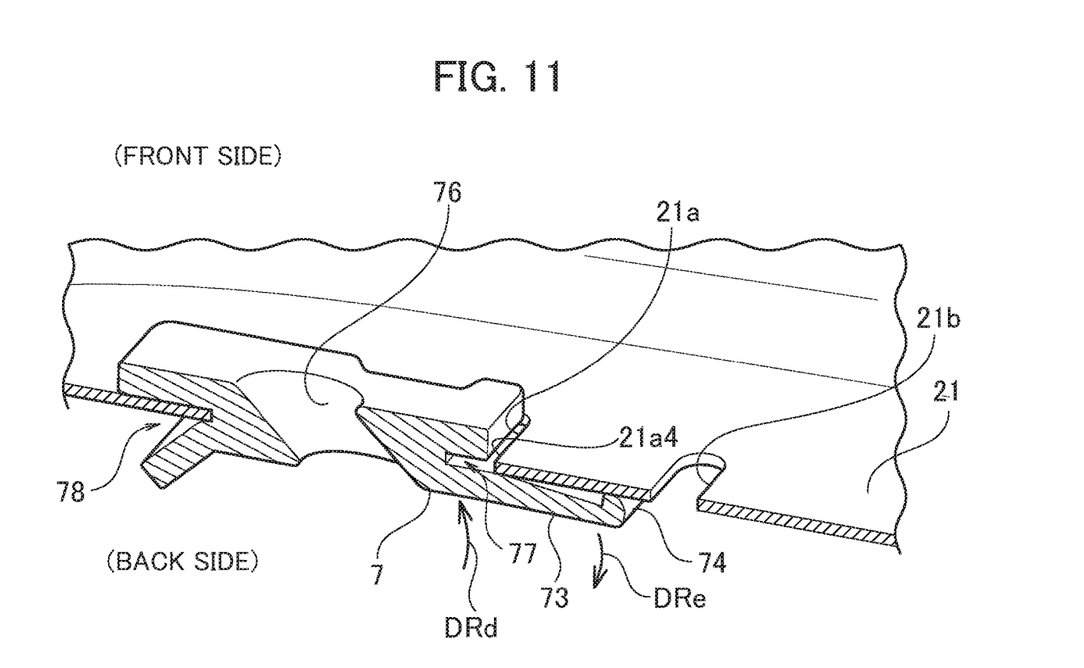
FIG. 11 is a fourth perspective diagram illustrating the procedure for attaching the bushing 7 to the bushing attachment hole part 21G.

(Step 4) See FIG. 11

The first overhanging part 72*b* that is the first engagement part of the top base 72 is capable of passing through the first opening 21*a*2 of the base engagement hole 21*a* that is the first hole. Accordingly, when the rotation of the bushing 7 is further advanced (arrow DRd), the entire top base 72 passes through the base engagement hole 21*a* and comes out to the front side of the upper wall part 21. Then, the bushing 7 is positioned so that the edge 21*a*4 of the first opening 21*a*2 faces the first groove part 77.

In this position, the claw part 74 abuts on the rear surface of the upper wall part 21, so that the rotation thereof is restricted, and the arm part 73 is bent in a direction illustrated by an arrow DRe.

Figure 12:
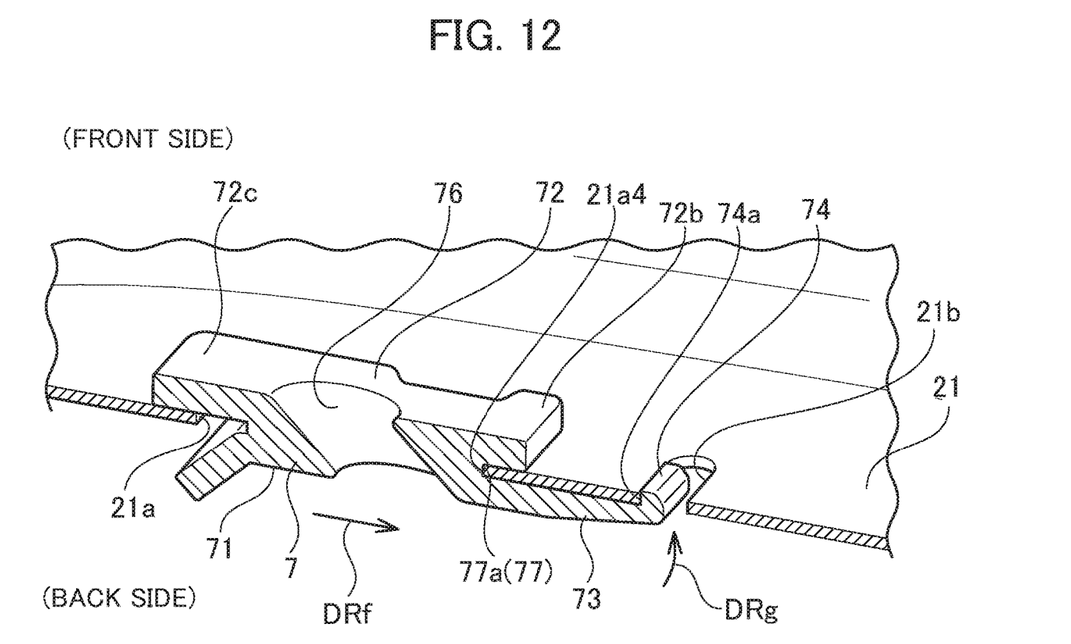
FIG. 12 is a fifth perspective diagram illustrating the procedure for attaching the bushing 7 to the bushing attachment hole part 21G.

(Step 5) See FIG. 12

The bushing 7 is moved along the upper wall part 21 so that the edge 21*a*4 is inserted in the first groove part 77 (arrow DRf).

Thus, the first overhanging part 72*b* as the first engagement part engages with the edge 21*a*4 of the base engagement hole 21*a* as the first hole.

Further, as described above, the distance L7 in the X direction between the back wall 77*a* of the first groove part 77 and the abutting surface 74*a* of the claw part 74 is formed equal to or slightly larger than the distance L21 (see FIG. 4) in the bushing attachment hole part 21G. The claw part 74 as the second engagement part thus enters and engages with the claw engagement hole 21*b* as the second hole, and the bending of the arm part 73 is eliminated.

In accordance with the above-described steps 1 to 5, the bushing 7 is attached to the bushing attachment hole part 21G of the upper wall 21.

The bushing 7 is removed from the bushing attachment hole part 21G by the reverse procedure.

That is, the arm part 73 is bent by hand or the like to separate the claw part 74 from the claw engagement hole 21*b*, and the entire bushing 7 is moved along the upper wall part 21 in a direction opposite to the arrow DRf of FIG. 12.

With the edge 21*a*5 inserted in the back of the second groove part 78, the bushing 7 is rotated in a direction opposite to the arrow DRc of FIG. 10, and the first overhanging part 72*b* is pulled out from the first opening 21*a*2 to the back side. Then, by moving the bushing 7 in a direction opposite to the arrow DRb of FIG. 9, the second overhanging part 72*c* is pulled out from the base engagement hole 21*a* to the back side of the upper wall part 21.

With the bushing 7 attached to the bushing attachment hole part 21G, downward movement of the bushing 7 in FIG. 12 is restricted by the first overhanging part 72*b* and the second overhanging part 72*c* abutting on the protruding parts 21*a*1, 21*a*1 (not shown in FIG. 12) of the upper wall part 21 and the vicinity of the edge 21*a*4 and the edge 21*a*5.

Upward movement of the bushing 7 in FIG. 12 is restricted by the base part 71 and the arm part 73 abutting on the peripheral part of the base engagement hole 21*a*. Leftward movement of the bushing 7 in FIG. 12 is restricted by the contact surface 74*a* of the claw part 74 abutting on the end surface 21*b*1 of the claw engagement hole 21*b*. Rightward movement of the bushing 7 in FIG. 12 is restricted by the first groove part 77 of the bushing 7 abutting on the edge 21*a*4 of the base engagement hole 21*a*. Movement of the bushing 7 in the width direction is restricted by the top base 72 of the bushing 7 abutting on one of the pair of protrusion parts 21*a*1, 21*a*1 of the base engagement hole 21*a*.

Mounting of the mat 5 is performed by inserting the straight part 6*d*2 of the guide wire 6 into the penetration hole

76 of the bushing 7 attached to the upper wall part 21 as described above, as illustrated in FIG. 7, for each of the support parts SL, SR.

Each of the linear parts 6c2, 6c2 of the guide wire 6 moves up and down with the forward and backward movement of the mat 5. That is, it reciprocates in the penetration hole 76 in the axial direction of the penetration hole 76.

Since the guide wire 6 is made from metal, and the bushing 7 is made from resin, reciprocation of the guide wire 6 in the penetration hole 76 is smooth. Moreover, the chamfered parts 76a, 76a are formed at the opening edges of the penetration hole 76. Thus, the surface of the guide wire 6 is hardly damaged when the frequency of reciprocation of the guide wire 6 increases, and the slidability associated with the reciprocation is maintained to a high degree with no practical interference.

The bushing 7 is easily engageable with and attachable to the upper wall part 21 and detachable from the upper wall part 21 by hand.

Thus, assembly of the vehicle seat is facilitated, and productivity is improved.

In the mat mounting structure TK, the separation of the bushing 7 from the upper wall part 21 of the seat back frame FR2 is performed by the series of operations including two different moving modes of the rotation and the linear movement of the bushing 7. Accordingly, when a force in one direction is applied to the bushing 7 attached to the upper wall part 21, the bushing 7 is not separated from the upper wall part 21. Thus, the mat mounting structure TK has high resistance to external force.

Moreover, multiple kinds of bushings 7 corresponding to different specifications of the mat 5 and the guide wire 6 are formed in the shape attachable to and detachable from the common bushing attachment hole part 21G, such as the thickness of the guide wire 6, an arrangement angle of the guide wire 6 with respect to the upper wall part 21, and a moving stroke of the guide wire 6 when the mat 5 moves back and forth.

Thus, the seat back frame FR2 is used as a common member for multiple kinds of mats 5 of different specifications, and productivity is further improved.

When the seat back frame has a penetration hole in which the guide wire is inserted, and a guide part, which is integrally formed on the peripheral edge of the penetration hole and is a projection part for guiding the guide wire, as in the conventional mat mounting structure, if the angle between the forming surface of the penetration hole and the guide wire is small, the tip of the guide wire may interfere with the guide part. On the other hand, the mat mounting structure TK enables the guide wire 6 to be smoothly inserted in and moved through the seat back frame FR2 at a small angle and in a small space without interference. It is achieved by a slight and easy change, such as the formation of the base engagement hole 21a and the claw engagement hole 21b for attaching and detaching the bushing 7 as the penetration hole without the guide part. It is achieved without a large change in shape of the conventional seat back frame.

(1) A mat mounting structure according to embodiments of the disclosure is a mat mounting structure for mounting a mat on a seat back frame in a seat back including a guide wire attachable to the mat configured to receive a force from a back of an occupant on the seat back, the guide wire including a straight part extending linearly in a longitudinal direction of the seat back frame on a head side or a root side of the seat back frame, a bushing including a penetration hole in which the straight part is insertable in the longitudinal direction, and an attachment hole part in the seat back frame, the bushing being detachably engageable with and attachable to the attachment hole part.

(2) A vehicle seat according to embodiments of the disclosure is a vehicle seat including a seat cushion, a seat back, a seat back frame in the seat back, and a mat mountable on the seat back frame by the above-described mat mounting structure.

(3) The bushing engaged with and attached to the attachment hole part may be configured to be detached from the attachment hole part by an operation including two moving modes of a rotation and a linear movement.

(4) The attachment hole part may include a first hole part and a second hole part, and the bushing may include a first engagement part engageable with the first hole part and a second engagement part engageable with the second hole part.

(5) The first engagement part may be configured to pass through the first hole part by a rotation, and the second engagement part may be engageable with the second hole part as well as the first engagement part may be engageable with the first hole part by a linear movement after the rotation.

The present disclosure is not limited to the embodiments described above, and can be variously modified without departing from the gist of the present disclosure.

In the mat mounting structure TK described as an example, the upper part of the guide wire 6 includes the arm parts 6d, 6d that are inserted and supported at the upper wall part 21 by the support parts SL and SR, and the lower connecting part 6c is formed at the lower part and supported on the frame side by the support part SB. However, the upper and lower parts may be reversed.

That is, straight connecting parts extending left and right may be formed on the upper part of the guide wire 6 and supported on the front end side of the seat back frame FR2 by the support part SB, and the arm parts 6d,6d may be formed on the lower part and inserted and supported on the root side of the seat back frame FR2 by the support parts SL and SR.

The invention claimed is:

1. A mat mounting structure for mounting a mat on a seat back frame in a seat back, comprising:
  a guide wire attachable to the mat configured to receive a force from a back of an occupant on the seat back, the guide wire comprising a straight part extending linearly in a longitudinal direction of the seat back frame on a head part or a root part of the seat back frame;
  a bushing comprising a penetration hole in which the straight part is insertable in the longitudinal direction; and
  an attachment hole part in the seat back frame, the bushing being detachably engageable with and attachable to the attachment hole part,
  wherein the attachment hole part comprises a first hole part and a second hole part, and the bushing comprises a first engagement part engageable with the first hole part and a second engagement part engageable with the second hole part, and
  the first engagement part is configured to pass through the first hole part by a rotation, and the second engagement part is engageable with the second hole part as well as the first engagement part is engageable with the first hole part by a linear movement after the rotation.

2. A vehicle seat, comprising:
a seat cushion;
a seat back;
a seat back frame in the seat back; and
a mat mountable on the seat back frame by the mat mounting structure according to claim 1.

* * * * *